United States Patent
Samuel et al.

(10) Patent No.: US 11,204,756 B1
(45) Date of Patent: Dec. 21, 2021

(54) DEPLOYING SOFTWARE UPDATES IN COORDINATION WITH END-USER PRODUCTIVITY

(71) Applicant: Dell Products L.P., Round Rock, TX (US)

(72) Inventors: Balasingh P. Samuel, Round Rock, TX (US); Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/904,293

(22) Filed: Jun. 17, 2020

(51) Int. Cl.
*G06F 8/65* (2018.01)
*G06F 11/34* (2006.01)

(52) U.S. Cl.
CPC ............ *G06F 8/65* (2013.01); *G06F 11/3438* (2013.01)

(58) Field of Classification Search
CPC ................. G06F 8/60; G06F 8/61; G06F 8/65
See application file for complete search history.

(56) References Cited

U.S. PATENT DOCUMENTS

| | | | |
|---|---|---|---|
| 10,841,241 B2* | 11/2020 | Wise | H04L 47/822 |
| 2007/0021116 A1* | 1/2007 | Okita | G06F 8/65 |
| | | | 455/428 |
| 2018/0189046 A1* | 7/2018 | Kunisetty | H04L 41/082 |
| 2021/0048996 A1* | 2/2021 | Marzorati | G06N 20/00 |

* cited by examiner

*Primary Examiner* — Duy Khuong T Nguyen
(74) *Attorney, Agent, or Firm* — Kirton McConkie; Brian Tucker

(57) ABSTRACT

Software updates can be deployed in end user devices in coordination with end-user productivity. A system monitoring engine can be employed on end user devices to compile productivity impact data from which heat maps may be created. An optimal deployment detection engine can employ the heat maps to create or maintain period-based groupings. When software updates are available, the optimal deployment detection engine can employ the period-based groupings to create optimal deployment plans specific to the end user devices. The installation of the software updates can then be performed on each end user device in accordance with that end user device's optimal deployment plan.

17 Claims, 9 Drawing Sheets

Optimal Deployment Plan 220 for End User Device 110-1

Software Update 1
    <UpdateMetadata> ... </UpdateMetadata>
    <Type>Driver</Type>
    <Criticality>Critical</Criticality>
    <UpdateWindow>Start time during Pn</UpdateWindow>
    <RebootRequired>Yes</RebootRequired>

Software Update 2
    <UpdateMetadata> ... </UpdateMetadata>
    <Type>Firmware</Type>
    <Criticality>Critical</Criticality>
    <UpdateWindow>Start time during P3</UpdateWindow>
    <RebootRequired>No</RebootRequired>

DEPLOYING SOFTWARE UPDATES IN COORDINATION WITH END-USER PRODUCTIVITY

CROSS-REFERENCE TO RELATED APPLICATIONS

N/A

BACKGROUND

The deployment of software updates is oftentimes disruptive to the end users' productivity. This is particularly true of driver and firmware updates which oftentimes require a system reboot to complete the installation process. Also, end users typically have little control over when a software update is installed. For example, an administrator may schedule the deployment of a software update for a particular time. If the software update is deployed while an end user is working, the end user may be limited to postponing the installation for a period of time (e.g., an hour). At some point, however, the end user will no longer be given the option to postpone the installation of the software update such as when the end user has postponed installation up to a specified deadline. In other instances, such as when a software update addresses a security vulnerability, an administrator may force the immediate deployment of the software update (i.e., the end user will have no option to postpone the installation of the software update). In short, given the increasing variance in work schedules, it is virtually impossible for an administrator to deploy a software update without disrupting the productivity of at least some end users.

BRIEF SUMMARY

The present invention extends to methods, systems, and computer program products for deploying software updates in coordination with end-user productivity. A system monitoring engine can be employed on end user devices to compile productivity impact data from which heat maps may be created. An optimal deployment detection engine can employ the heat maps to create or maintain period-based groupings. When software updates are available, the optimal deployment detection engine can employ the period-based groupings to create optimal deployment plans specific to the end user devices. The installation of the software updates can then be performed on each end user device in accordance with that end user device's optimal deployment plan.

In some embodiments, the present invention may be implemented as a method for deploying software updates in coordination with end-user productivity. An optimal deployment detection engine can receive heat maps from a plurality of end user devices and create period-based groupings from the heat maps. It can then be determined that one or more software updates are to be deployed to the plurality of end user devices. For each of the plurality of end user devices, the period-based groupings can be used to generate an optimal deployment plan for deploying the one or more software updates to the respective end user device.

In some embodiments, the present invention may be implemented as computer storage media storing computer executable instructions which when executed implement a method for deploying software updates in coordination with end-user productivity. This method can include: compiling productivity impact data on a plurality of end user devices; for each of the end user devices, creating a heat map from the respective productivity impact data; creating period-based groupings from the heat maps; when one or more software updates are to be deployed to the end user devices, generating, for each of the end user devices, an optimal deployment plan from the period-based groupings; and sending to each of the end user devices, the respective optimal deployment plan; and installing the one or more software updates on each end user device in accordance with the respective optimal deployment plan.

In some embodiments, the present invention may be implemented as system for deploying software updates in coordination with end-user productivity. The system may include: a plurality of end user devices; a software update deployment solution; and an optimal deployment detection engine. The optimal deployment detection engine may be configured to receive heat maps corresponding to the end user devices, create period-based groupings from the heat maps and, when one or more software updates are to be deployed to the end user devices, generate for each of the end user devices, an optimal deployment plan from the period-based groupings.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 4 provides an example of an optimal deployment plan.

DETAILED DESCRIPTION

In the specification and the claims, the term "software update" should be construed as encompassing an update to any type of software that may exist on an end user device including, but not limited to, an update to a driver, firmware, a component of an operating system, a utility, an application, etc. The term "end user device" should be construed as encompassing any type of computing device to which a software update may be deployed including, but not limited to, desktops, laptops, thin clients, tablets, smart phones, etc.

Figure 1:
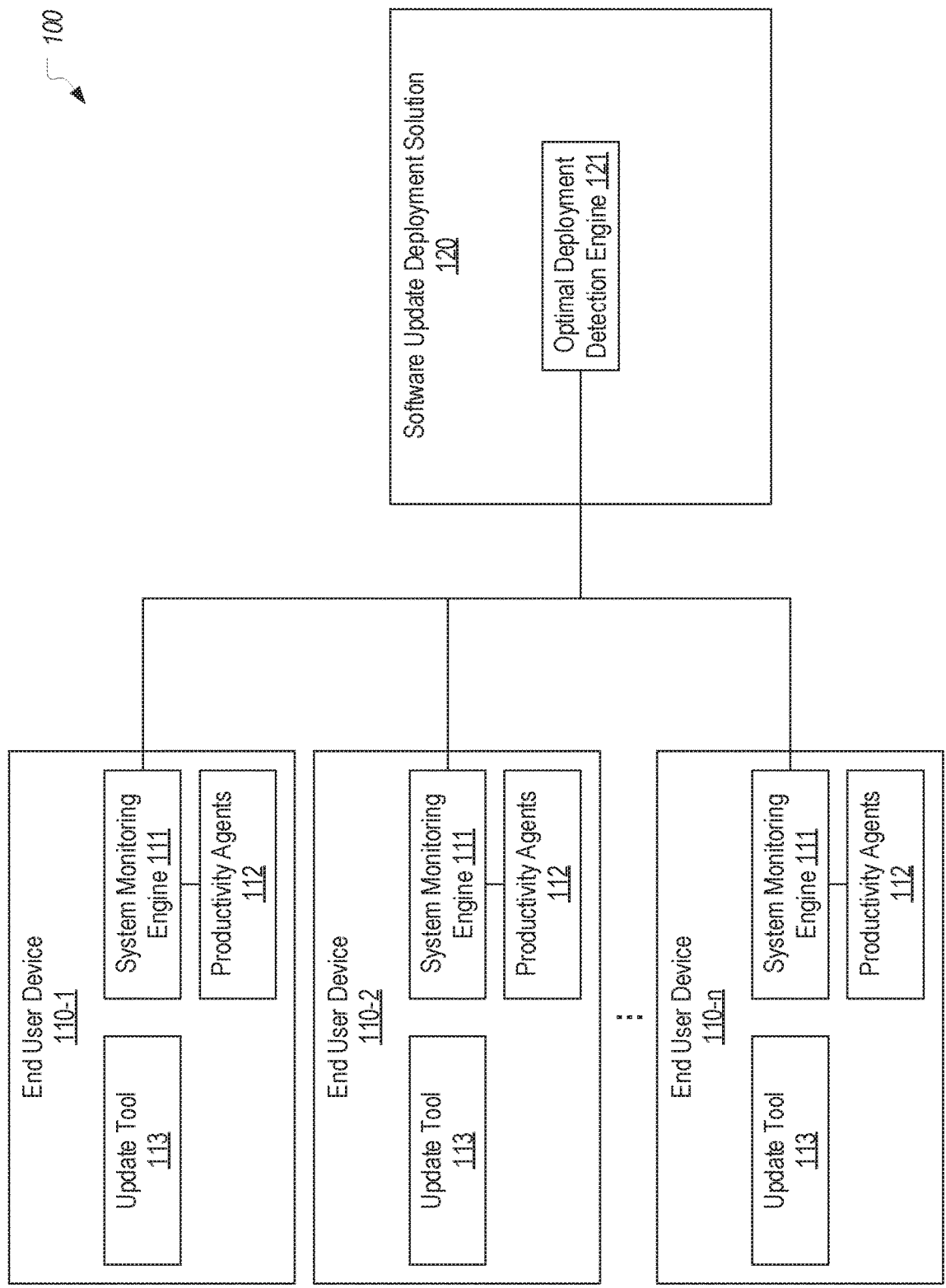
FIGS. 1 and 1A each illustrate various components that can be employed on end user devices and within a software update deployment solution to enable embodiments of the present invention to be implemented.

FIG. 1 illustrates an example computing environment 100 in which the present invention may be implemented. Computing environment 100 includes a number of end user devices 110-1 through 110-$n$ (or generally "end user device(s) 110") and a software update deployment solution 120. End user devices 110 and software update deployment solution 120 can be interconnected via any suitable network connection including a local area network or the internet.

In a common example, end user devices 110 could represent a group or all of a particular entity's end user devices that are managed by an IT department. However, end user devices 110 could represent any other suitable combination of end user devices including a group or all of a particular OEM's (e.g., Dell's or HP's) end user devices.

Software update deployment solution 120 is intended to generally represent the various components that may be employed to manage the deployment of software updates to end user devices 110. To simplify this description, many components that may typically form part of software update deployment solution 120 are not depicted or described, but such components may include a telemetry server, a catalog server, a support server, a download server, etc. However, embodiments of the present invention should not be limited to any particular configuration of software update deployment solution 120 but should be construed in accordance with the functionality described herein.

Figure 1A:
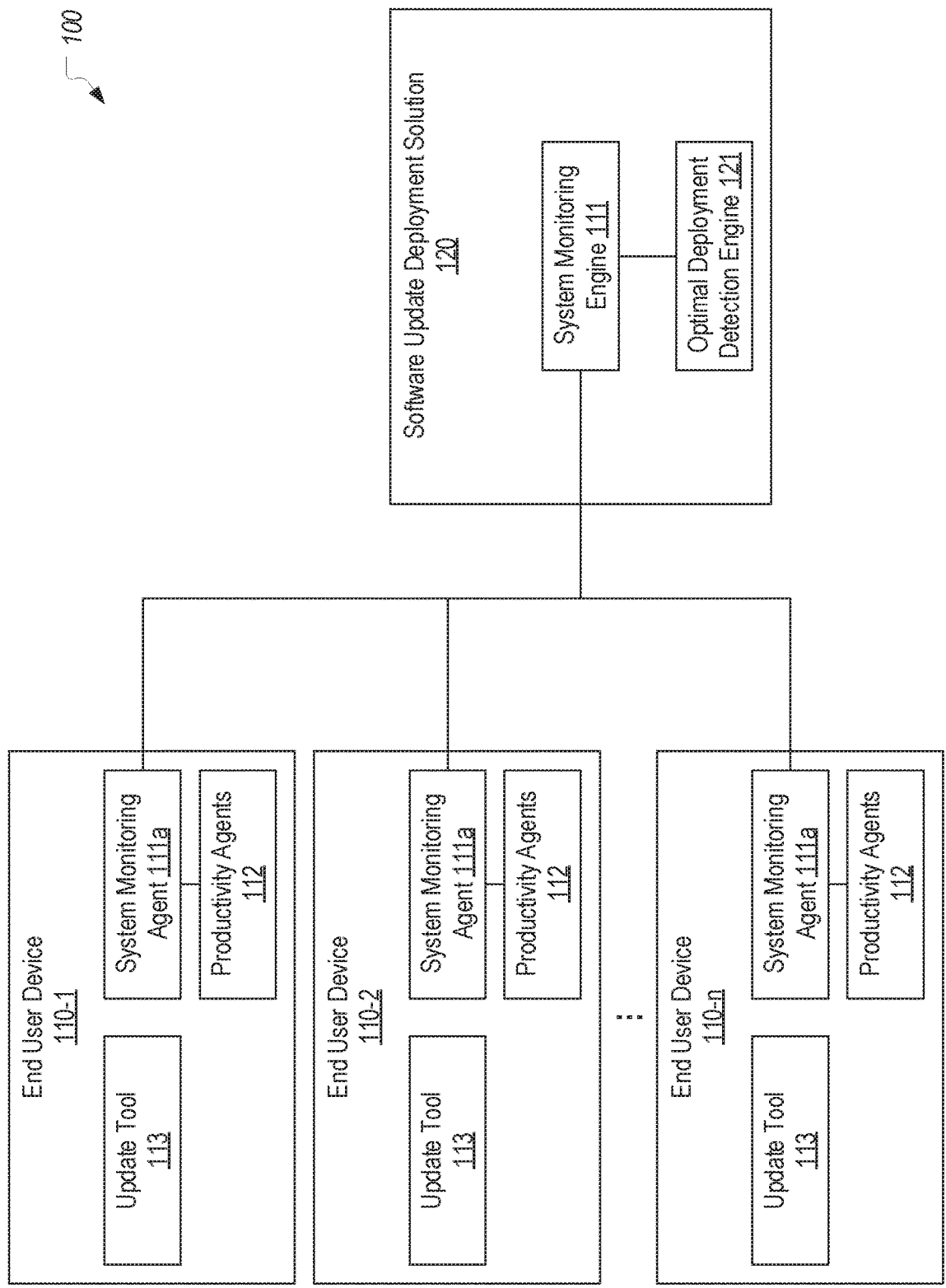

As an overview, in some embodiments of the present invention, a system monitoring engine 111 may be installed on each end user device 110 and may interface with one or more productivity agents 112 that also execute on the end user device. System monitoring engine 111 may communicate with an optimal deployment detection engine 121 that is part of software update deployment solution 120. In other embodiments, and as represented in FIG. 1A, system monitoring engine 111 may be part of software update deployment solution 120 and may include or employ a system monitoring agent 111a that executes on each end user device 110. In other words, in some embodiments, the functionality that system monitoring engine 111 provides may be performed entirely on end user devices 111, while in other embodiments, such functionality may be performed partially on end user devices and partially within software update deployment solution 120. Therefore, subsequent references to system monitoring engine 111 may be construed as encompassing the architecture of FIGS. 1 and 1A when appropriate.

An update tool 113 can also be installed on each end user device 110. Update tool 113 can be configured to retrieve and install software updates on end user device 110. Also, as described below, update tool 113 can be configured to interface with optimal deployment detection engine 121 to cause software updates to be deployed on end user devices 110 in coordination with the end users' productivity.

System monitoring engine 111 (or system monitoring agent 111a) can be configured to employ productivity agents 112 to compile "productivity data" for the particular end user device 110. This productivity data may include any one or more of the following: system load data such as CPU load, GPU load, network consumption, memory consumption, etc.; scheduling data such as a virus scan schedule, the end user's schedule (e.g., Outlook calendar information); contextual data such as user proximity; use data such as a number of open applications or documents, etc. Accordingly, productivity data can be viewed as data representing whether or to what extent the end user is using end user device 110.

System monitoring engine 111 can also be configured to employ productivity agents 112 to compile "state data" for the particular end user device 110. This state data may include event data such as system events or errors (e.g., a number of applications that are closed during installation of a software update during a particular time period), current software versions, reboot requirements for a particular software update, identifiers of end user device 110 (e.g., a service tag, platform or model), etc. Accordingly, state data can be viewed as data that is employed to determine which software updates may apply to a particular end user device 110, how such updates will be or were deployed on the particular end user device 110 (e.g., whether the deployment of a software update on the particular end user device 110 required a reboot) and possibly the urgency of deploying such updates (e.g., to correct some error). The combination of productivity data and state data will be referred to as "productivity impact data." As will be described in greater detail below, in some embodiments, system monitoring engine 111 may compile productivity data and state data at different times and for slightly different reasons.

Productivity agents 112 can represent any components that can provide such productivity impact data to system monitoring engine 111. For example, productivity agents 112 may include the Windows Event Viewer, Task Manager or Device Manager (or equivalent utilities in other operating systems), an SMBIOS table, the UEFI Adapter Information Protocol, an ACPI table, BIOS-IQ data, a BIOS-WMI Interface, a UEFI runtime service, Antivirus or Malware software, Outlook or another productivity solution, a proximity sensor, etc. Accordingly, system monitoring engine 111 (or system monitoring agent 111a) may employ a wide variety of productivity agents 112 to obtain a wide variety of productivity impact data that is specific to the particular end user device 110.

System monitoring engine 111 can employ the productivity impact data, and particularly the productivity data, that it receives from productivity agents 112 to create a heat map for the particular end user device 110. The heat map can define when, and possibly to what extent, the end user device 110 is being used. Each system monitoring engine 111 can provide the heat map for the particular end user device 110 to optimal deployment detection engine 121 which can then employ the heat maps to deploy software updates to end user devices 110 in coordination with each end user's productivity. In other words, optimal deployment detection engine 121 can leverage the heat maps to deploy software updates in a manner that will minimize the impact on the end users' productivity. FIGS. 2A-2E provide an example of how this process may be implemented in some embodiments of the present invention.

Figure 2A:
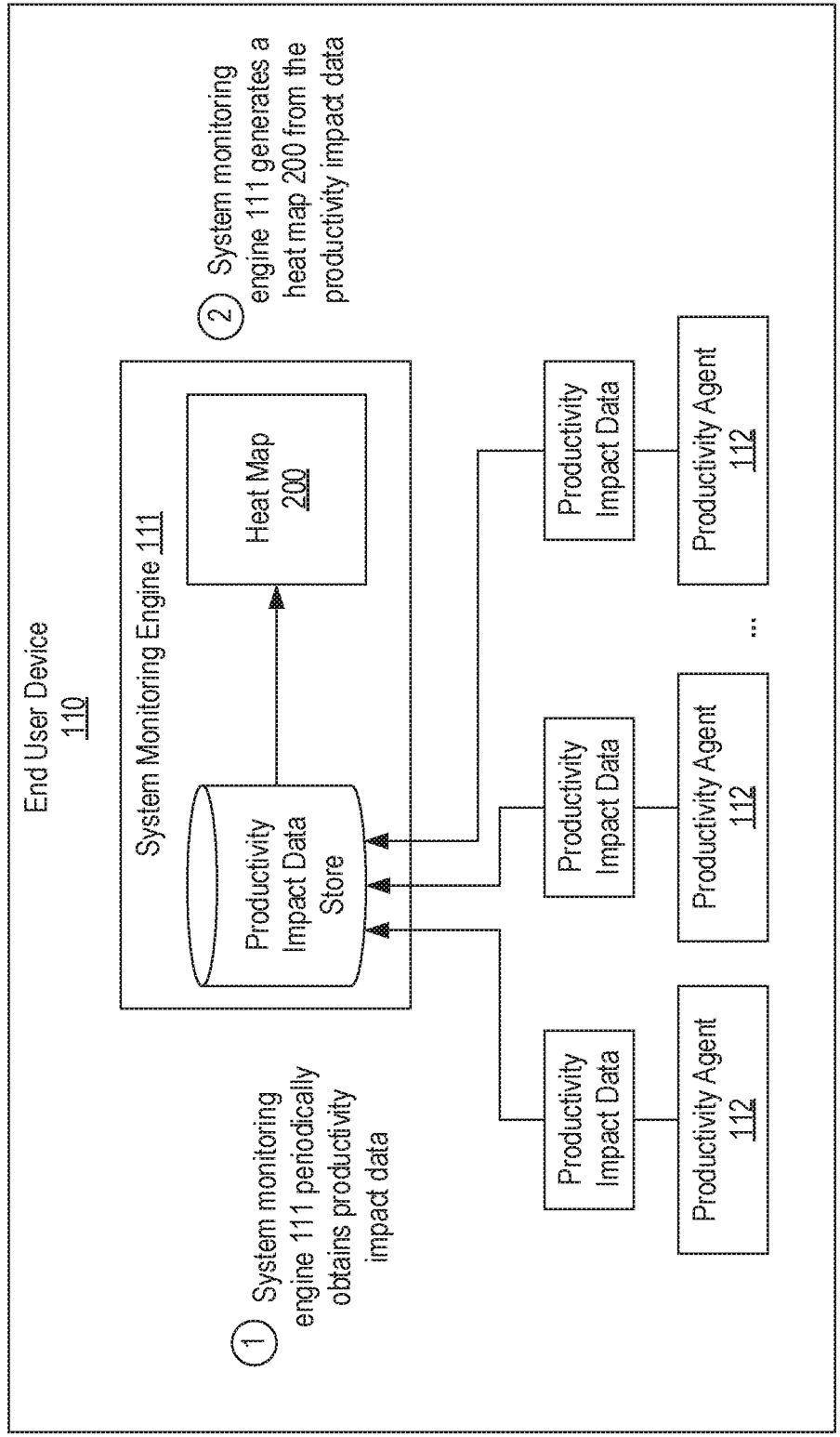
FIG. 2A-2E provide an example of how software updates can be deployed in coordination with end-user productivity.

FIG. 2A provides an example of how system monitoring engine 111 can create a heat map 200 based on productivity impact data that it receives from productivity agents 112. In step 1, system monitoring engine 111 can periodically obtain productivity impact data from one or more productivity agents 112 and may maintain this productivity impact data in a productivity data store. For example, system monitoring engine 111 could periodically retrieve productivity data such as system load data, scheduling data, contextual data and use data and store such productivity data in productivity impact data store in association with a timestamp or other identifier of a period to which the productivity impact data pertains. System monitoring engine 111 could also store state data that may be time-specific in a similar manner. For example, if a software update was installed at a particular time, system monitoring engine 111 could store an indication of a number of applications that were closed as a result of installing the software update at that time. Accordingly, although productivity data may be the primary type of data that is used to represent a user's productivity at a particular time, some state data may also serve this purpose.

As one example only, system monitoring engine 111 could obtain productivity impact data for each hour. In such a case, the productivity impact data for a particular hour could indicate whether or how long the user is present at end user device 110 during the hour, system load data during the hour (e.g., an average load over the hour or loads at particular times during the hour), any scheduling data for that hour (e.g., whether the user has any scheduled meetings during the hour or whether a virus or other type of scan is or will be performed during the hour), use data during the hour (e.g., how many applications are run during the hour, a number of documents that are open during the hour), etc. System monitoring engine 111 may also obtain and store state data such as system events or errors that have occurred (whether before, during or after the installation of a software update), current software versions, whether a software update will require or required a reboot, etc. As indicated above, such state data may not need to be obtained at the same periodic intervals as the productivity data. In any case, system monitoring engine 111 can maintain productivity impact store that stores productivity impact data obtained over periods of time.

In step 2, system monitoring engine 111 can generate heat map 200 from the productivity impact data. Heat map 200 can define multiple periods of time (e.g., hour periods, 30 minute periods, 15 minute periods, etc.) and can associate a "productivity value" with each period. For example, heat map 200 could employ productivity values of "hot" or "cold" which represent whether end user device 110 was being used or not respectively during the particular period of time. Similarly, heat map 200 could employ productivity values in multiple variations of "hot" and "cold" to represent to what extent end user device 110 was being used during the particular period of time. These productivity values could be in any form including colors, numbers, words, etc.

Figure 3:
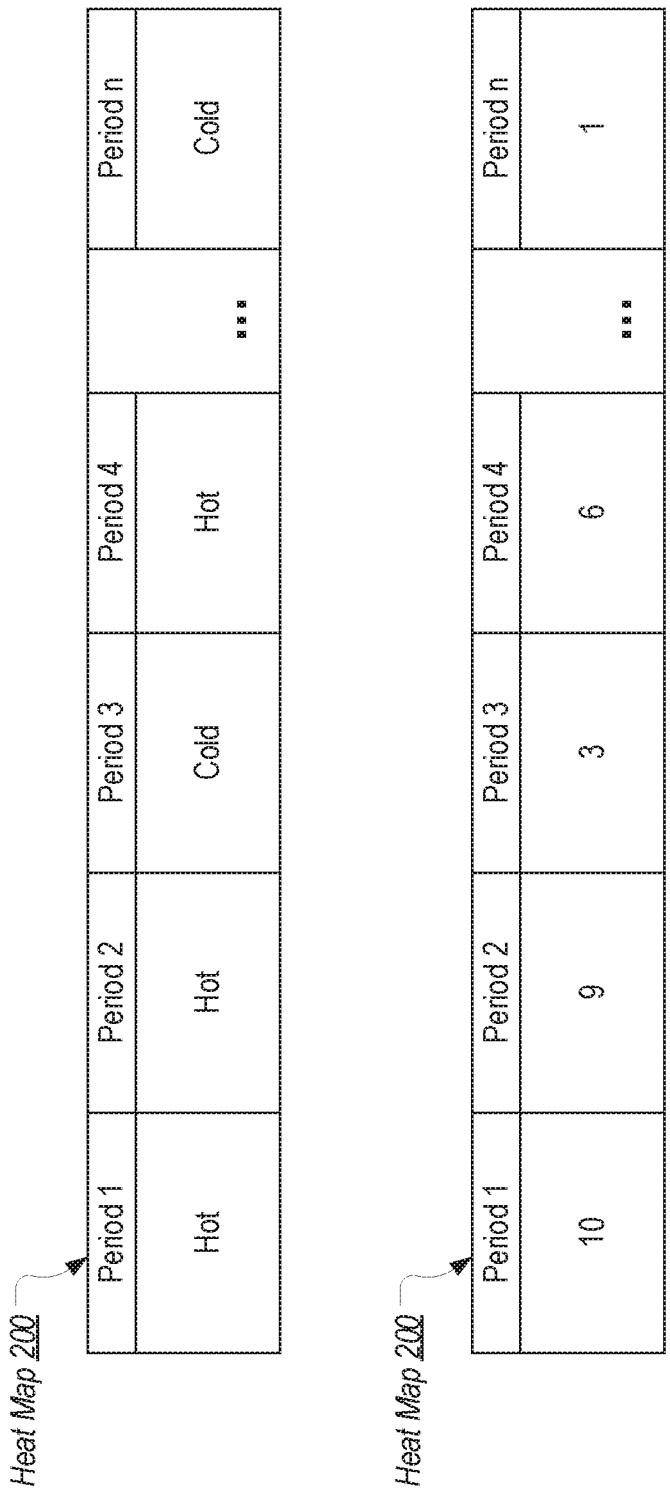
FIG. 3 provides examples of a heat map.

FIG. 3 provides simplified examples of how heat map 200 could be configured. In one example, heat map 200 associates a productivity value of either "hot" or "cold" with each time period. Accordingly, in this example, heat map 200 indicates that the respective end user device 110 was being used during time periods 1, 2 and 4 but was not being used during time periods 3 and n. In another example, heat map 200 associates a productivity value in the range of 1-10 with each time period where 10 represents a maximum productivity value and 1 represents a minimum productivity value. Accordingly, in this example, heat map 200 indicates that the respective end user device 110 was being extensively used during periods 1 and 2, moderately used during time period 4, minimally used during time period 3 and not used during time period n. In some embodiments, in addition to associating a productivity value with each time period, heat map 200 can also include, reference or otherwise be associated with state data and/or may specify scheduling data including for future time periods.

In some embodiments, the time periods defined in a heat map 200 may be specific to a day of the week but not to a particular day. For example, a time period in a heat map 200 can define time periods of Monday from 8:00 to 9:00, Monday from 9:00 to 10:00, Monday from 10:00 to 11:00, etc. so that all one hour periods in a week (i.e., Sunday through Saturday) or work week (e.g., Monday through Friday) are represented in the heat map. In other embodiments, the time periods in a heat map 200 may be specific to a particular day such as Monday, May 25, 2020 from 8:00 to 9:00.

System monitoring engine 111 can employ a variety of techniques for converting the productivity impact data into productivity values. For example, system monitoring engine 111 could associate a productivity value of hot to a time period if any of the productivity data obtained during the time period indicates that the end user was using the end user device 110 during the time period. Similarly, system monitoring engine 111 could employ a weighted formula that generates a productivity value from a range of possible values based on the various types of productivity data obtained during the time period. For example, if the productivity data indicates that the user was not present at the respective end user device 110 during a period of time in which many applications were running, system monitoring engine 111 may assign a productivity value indicating that the end user device 110 was not being used or was minimally used during that time period. As another example, if the productivity data indicates that the user was present at the respective end user device 110 during a period of time in which a conferencing application was running, system monitoring engine 111 may assign a productivity value indicating that the end user device 110 was being used extensively during that time period.

Figure 2B:
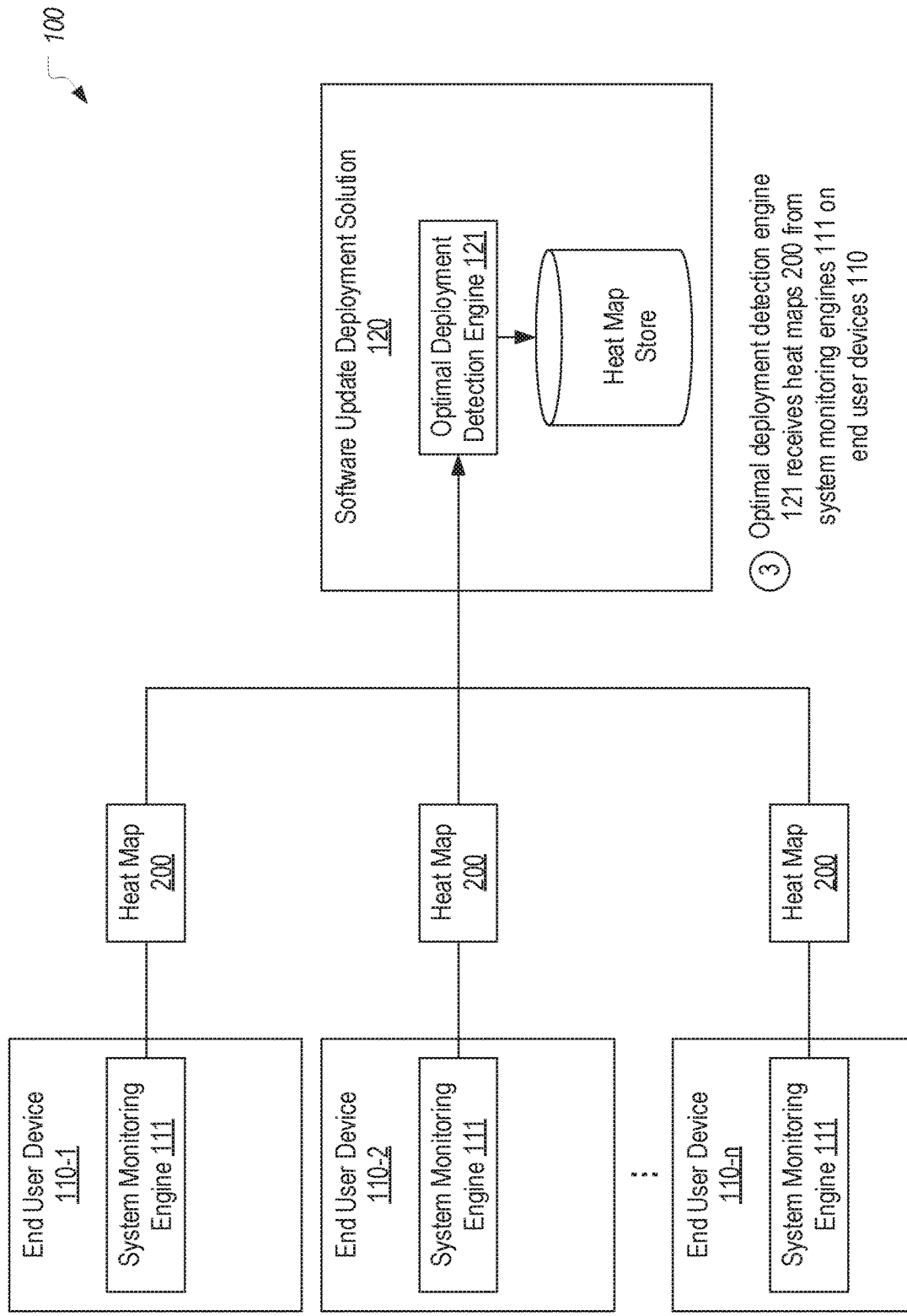

Turning to FIG. 2B, in step 3, optimal deployment detection engine 121 can receive heat maps 200 that system monitoring engine 111 creates for each end user device 110. In other words, optimal deployment detection engine 121 receives a heat map 200 particular to each end user device 110. In some embodiments, optimal deployment detection engine 121 may receive heat maps 200 periodically (e.g., every day, once a week, etc.), while in other embodiments, optimal deployment detection engine 121 may receive heat maps 200 on demand (e.g., when requested by an administrator, when a software update is to be deployed, etc.). As indicated, optimal deployment detection engine 121 may maintain heat maps 200 in a heat map store.

The amount of time that a heat map 200 for a particular end user device 110 encompasses can be a configurable setting. For example, an administrator could configure system monitoring engine 111 and/or optimal deployment detection engine 121 to create/compile heat maps 200 encompassing a single day, multiple days, a week, multiple weeks, etc. Also, system monitoring engine 111 may create multiple heat maps 200 for the same end user device 110 encompassing different time periods and provide these multiple heat maps 200 to optimal deployment detection engine 121 for subsequent use. In any case, optimal deployment detection engine 121 can store at least one heat map 200 for each particular end user device 110 which defines productivity impact data for the particular end user device 110 over a period of time. Typically, the heat map(s) 200 obtained for each particular end user device 110 may encompass the same time period. However, this need not be the case in each embodiment. For example, heat map(s) 200 obtained for one end user device 110 may encompass 7 days, while heat map(s) 200 obtained for another end user device 110 may encompass 6, 8 or some other number of days.

Figure 2C:
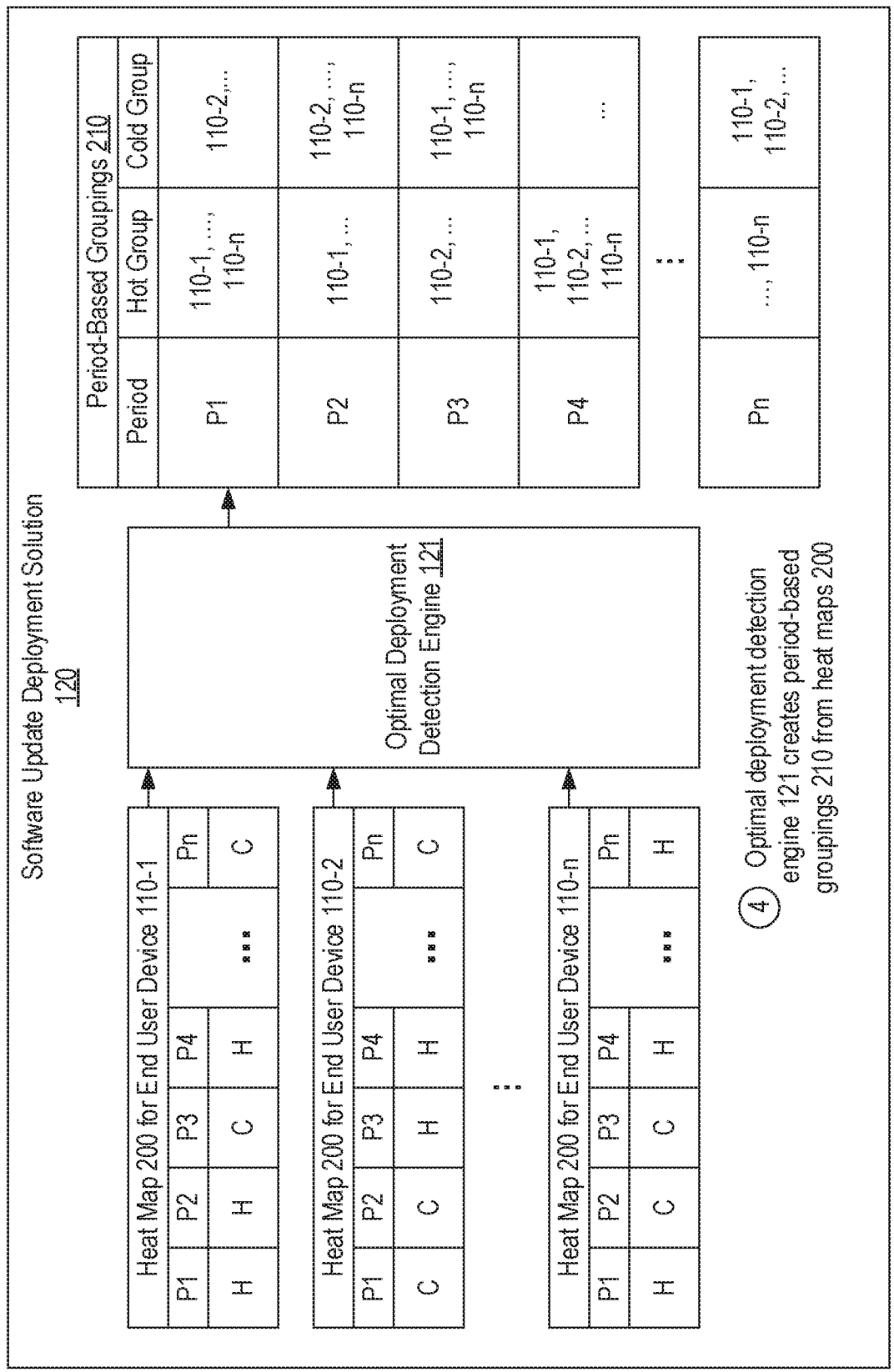

Turning to FIG. 2C, once it has obtained heat maps 200 for each end user device 110, in step 4, optimal deployment detection engine 121 can create period-based groupings 210 from heat maps 200. Period-based groupings 210 group the end user devices 110 into groupings for each of a number of time periods. For example, period-based groupings 210 could identify periods over a week or work week and, for each period, group the end user devices 110 into two or more groups based on the productivity values assigned to the user devices 110 for the respective period.

FIG. 2C is based on an example where heat maps 200 employ a binary productivity value (hot or cold). Accordingly, period-based groupings 210 in FIG. 2C comprise two groupings, a hot group and a cold group, for each time period. In embodiments where heat maps 200 employ a range of productivity values, optimal deployment detection engine 121 could create period-based groupings 210 having more than two groupings. Although the number of groupings could match the number of productivity values in the range (e.g., 10 groupings for the range of productivity values from 1-10), this need not be the case in every embodiment. For example, even if a heat map 200 employed productivity values in the range of 1-10, optimal deployment detection engine 121 could create period-based groupings 210 with less than 10 groupings (e.g., productivity values of 1 and 2 map to very cold, productivity values of 9 and 10 map to very hot, etc.), including with 2 groupings (e.g. productivity values from 1-5 map to cold and productivity values from 6-10 map to hot). Also, there need not be a one-to-one mapping between the periods defined in heat maps 200 and the periods encompassed by period-based groupings 210. For example, two or more periods defined in heat map 200 could map to the same relative period (e.g., in heat map 200, P1 could represent the 8:00 hour on one Monday and P169 could represent the same 8:00 hour on the next Monday, both of which could be mapped to, averaged or otherwise combined in the P1 period in period-based groupings 210).

Regardless of the number of groupings that may be employed in period-based groupings 210, optimal deployment detection engine 121 can employ the productivity values defined for the various time periods in a heat map 200 for a particular end user device 110 to place the particular end user device 110 in the appropriate grouping for each time period. For example, in FIG. 2C, period-based groupings 210 indicate that, for period P1, end user devices 110-1, 110-n and others are in the hot group while end user device 110-2 and others are in the cold group. In a basic example, this may represent that, during period P1, which could present the 8:00 hour on Mondays, the users of end user devices 110-1, 110-n and others were being productive while the users of end user device 110-2 and others were not. Of course, in a more complex example, period-based groupings 210 could represent the extent to which the end users of the end user devices 110 were being productive.

The time periods represented in period-based groupings 210 need not necessarily be viewed as historical time periods. For example, period-based groupings 210 could represent a prediction of whether or to what extent each end user device 110 would be used during each period based on historical productivity values reported in heat map 200. Therefore, optimal deployment detection engine 121 may update and/or refine period-based groupings 210 over time as it continues to receive heat maps 200 from end user devices 110 (e.g., using averaging, trend analysis or some other static or dynamic technique on the productivity values reported in heat maps 200 to assign each end user device 110 to a particular grouping for each period represented in period-based groupings 210). In short, period-based groupings 210 are derived from heat maps 200 and can be viewed generally as identifying which end users are likely to be using their end user devices 110, or to what extent they will be using their end user devices 110, during the periods of time.

Figure 2D:
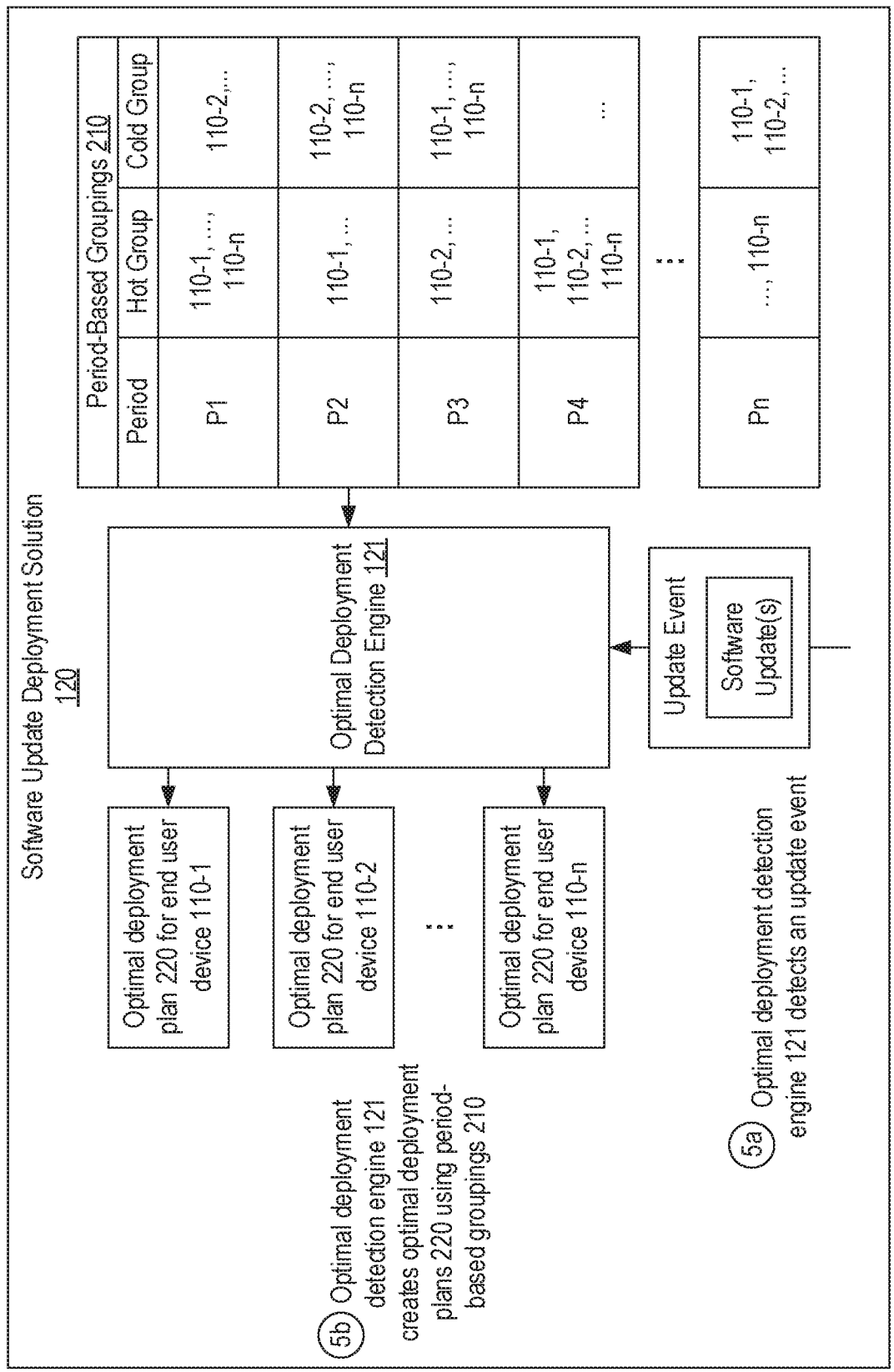

With period-based groupings 210 defined (whether one time or ongoing) and when it is desired to deploy one or more software updates, optimal deployment detection engine 121 can employ period-based groupings 210 to create an optimal deployment plan for each end user device 110 (or at least for each end user device 110 to which the one or more software updates are to be deployed). FIG. 2D represents one example of how optimal deployment detection engine 121 may create an optimal deployment plan.

In step 5a, it is assumed that optimal deployment detection engine 121 detects an update event relating to one or more software updates. This update event is intended to generally represent any occurrence or action relating to the deployment of one or more software updates. For example, the update event could be a request from update tool 113 on one of end user devices 110 for the one or more software updates. Update tool 113 could have identified that the one or more software updates are available by interfacing with a component of software update deployment solution 120. The update event could also be a request from an administrator that identifies the one or more software updates to be deployed. The update event could also be a notification received from another component of software update deployment solution 120 identifying the availability of the one or more software updates. In short, step 5a can represent any way in which optimal deployment detection engine 121 may determine that one or more software updates are available to be deployed on end user devices 110 (or a subset of end user devices 110). Of importance is that, at this step, optimal deployment detection engine 121 is aware of the particular software update(s) that are to be deployed.

In step 5b, optimal deployment detection engine 121 uses period-based groupings 210 to create an optimal deployment plan 220 for deploying the one or more software updates on each end user device 110 (or a subset of end user devices 110). Notably, optimal deployment plan 220 creates a particular optimal deployment plan 220 for each particular end user device 110 so that the one or more software updates can be deployed on the particular end user device 110 in coordination with the productivity of the user of the particular end user device 110.

Optimal deployment detection engine 121 may create optimal deployment plans 220 based only on period-based groupings 210 or based on period-based groupings 210 and state data that may be specific to the particular end user device 110 or state data for other end user devices 110. For example, optimal deployment engine 121 could create an optimal deployment plan 220 for end user device 110-1 based only on how end user device 110-1 is grouped in period-based groupings 210. In such cases, optimal deployment engine 121 could identify an update window for each software update to be deployed to end user device 110-1 where the update window falls within a period for which end user device 110-1 is in the cold group (or some other group that represents a period when the user of end user device 110-1 is inactive or minimally active) such as during periods P3 and Pn.

In another example, prior to creating optimal deployment plans 220, optimal deployment detection engine 121 may select a "pilot group" of end user devices 110 on which the one or more software updates will initially be deployed to thereby create state data particular to the one or more software updates. For example, during the deployment of the one or more software updates on the end user devices 110 in the pilot group, system monitoring engine 111 running on the end user devices 110 in the pilot group could employ productivity agents 112 to gather state data such as how long it took to install a software update, whether the installation required a reboot, etc. System monitoring engine 111 may relay this state data specific to the software update back to optimal deployment detection engine 121, whether separately or as part of a heat map 200. Optimal deployment detection engine 121 can then use the state data specific to the software update in conjunction with period-based groupings 210 in creating optimal deployment plans 220 for end user devices 110 outside the pilot group.

The pilot group could be selected as a group of end user devices 110 that are in the cold grouping at the time when the software update(s) are to be deployed to thereby attempt to minimize the impact on productivity that the "pilot deployment" will cause. In other instances, however, the pilot group could also include end user devices 110 from a hot grouping which in turn would enable optimal deployment detection engine 121 to gather state data from end user devices 110 that may or may not be in use during the pilot deployment. In short, the pilot group can be used to measure the impact of installing a software update so that such impact can be used to create optimal deployment plans.

FIG. 4 provides an example of an optimal deployment plan 220 for end user device 110-1 and will be used to describe how optimal deployment detection engine 121 may generate an optimal deployment plan 220 for an end user device 110 when various software updates, including software update 1 and software update 2, are to be deployed. For this example, it will be assumed that optimal deployment detection engine 121 deployed the software updates to a pilot group and received back state data specific to the software updates including that software update 1 required a reboot but software update 2 did not.

As shown in FIG. 4, software update 1 is a driver update that has been determined to be critical and requires a reboot. Software update 2 is a firmware update that is also critical but does not require a reboot. The criticality of a software update could be determined in any manner including based on state data, administrator input, the update provider's input, etc. Based on these assumed characteristics of the software updates, optimal deployment detection engine 121 can examine period-based groupings 210 and identify an optimal "update window" for each software update on each particular end user device 110. For example, in FIG. 4, optimal deployment detection engine 121 has selected a start time within period Pn for the installation of software update 1 and a start time within period P3 for the installation of software update 2. With reference to period-based groupings 210 as shown in FIG. 2D, optimal deployment detection engine 121 may have selected these start times because they fall within periods when end user device 110-1 is in the cold group. Using the second example of heat map 200 in FIG. 3 as an example, optimal deployment detection engine 121 may have selected a start time within period Pn for software update 1—which requires a reboot—because end user device 110-1 could be grouped in a "very cold" group during period Pn (i.e., a group to which the productivity value of 1 is mapped). Similarly, optimal deployment detection engine 121 may have selected a start time within period P3 for software update 2—which does not require a reboot—because end user device 110-1 could be grouped in a "cold" group during period P3 (i.e., a group to which the productivity value of 3 is mapped). Notably, optimal deployment detection engine 121 could use other state information obtained from the pilot group to create optimal deployment plans 220 including, for example, the average amount of time it takes to install the software update.

As can be seen, as a result of this functionality, an optimal deployment plan 220 will be created for each end user device 110 to which the software update(s) are to be deployed. Each optimal deployment plan 220 should be optimal, or at least optimized, for the productivity of the user of the particular end user device 110.

Figure 2E:
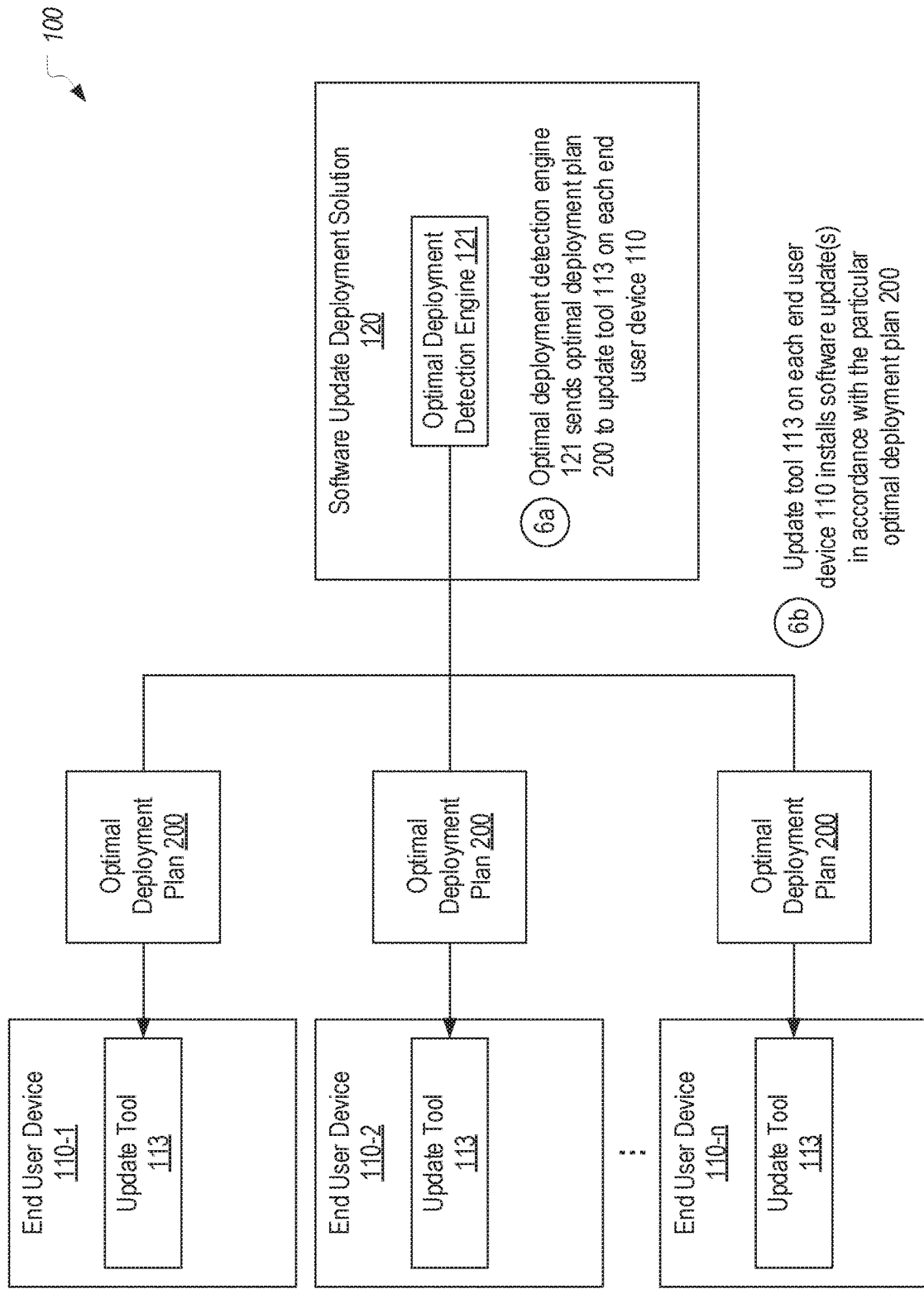

Turning to FIG. 2E, in step 6a, optimal deployment detection engine 121 can send each optimal deployment plan 220 to update tool 113 on the corresponding end user device 110. In step 6b, update tool 113 can then cause each software update to be installed on the end user device 110 in accordance with the particular optimal deployment plan 220. For example, update tool 113 on end user device 110-1 could cause software update 2 to be installed during period P3 and could cause software update 1 to be installed during period Pn. In this way, the deployment of software updates can be coordinated with the productivity of the end users thereby minimizing the likelihood that the deployment will negatively impact productivity.

Notably, as update tool 113 installs the software update(s), system monitoring engine 111 may perform the above-described functionality to continue to compile productivity impact data that optimal deployment detection engine 121 can use to further refine/enhance the process of creating optimal deployment plans 220. Accordingly, over time, embodiments of the present invention can create "more optimal" optimal deployment plans 220.

To summarize, a system monitoring engine (or system monitoring agent) can be employed on end user devices to compile productivity impact data from which heat maps may be created. An optimal deployment detection engine can employ the heat maps to create/maintain period-based groupings. When software updates are available, the optimal deployment detection engine can employ the period-based groupings to create optimal deployment plans specific to the end user devices. The installation of the software updates can then be performed on each end user device in accordance with that end user device's optimal deployment plan.

Because embodiments of the present invention enable software updates to be deployed in coordination with end-user productivity, end user devices are more likely to be updated with the latest software. As a result, there may be fewer security and/or performance issues than would otherwise occur if the software updates were not deployed in a timely fashion.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for deploying software updates in coordination with end-user productivity, the method comprising:
   compiling, by one or more productivity agents executing on each of a plurality of end user devices, productivity impact data for each of the plurality of end user devices, the productivity impact data including productivity data for the respective end user device for each of a plurality of periods, the productivity data for the respective end user device comprising system load data for each of the plurality of periods, scheduling data for each of the plurality of periods, contextual data for each of the plurality of periods and use data for each of the plurality of periods, wherein the contextual data includes user proximity data and the use data includes a number of open applications or documents;
   creating, from the productivity impact data compiled for each of the plurality of end user devices, heat maps for the plurality of end user devices, each heat map defining, based on the productivity impact data for the respective end user device, whether the respective end user device was in use or the extent to which the respective end user device was in use during each of the plurality of periods;
   receiving, at an optimal deployment detection engine, the heat maps for the plurality of end user devices;
   creating period-based groupings from the heat maps, wherein the period-based groupings group the plurality of end user devices into groupings for each of the plurality of periods;
   determining that one or more software updates are to be deployed to the plurality of end user devices;
   for each of the plurality of end user devices, using the period-based groupings to generate an optimal deployment plan for deploying the one or more software updates to the respective end user device; and
   sending the optimal deployment plans to the respective end user devices to cause each end user device to install the one or more software updates in accordance with the respective optimal deployment plan.

2. The method of claim 1, wherein each heat map defines a productivity value for each of the plurality of periods for the respective end user device.

3. The method of claim 1, wherein the productivity value for each of the plurality of periods is selected from a range of productivity values.

4. The method of claim 1, wherein the period-based groupings comprise at least two groupings of the end user devices for each of the plurality of periods.

5. The method of claim 4, wherein each of the end user devices is assigned to one of the at least two groupings for each of the plurality of periods.

6. The method of claim 5, wherein each heat map defines a productivity value for each of the plurality of periods for the respective end user device, and wherein each of the end user devices is assigned to one of the at least two groupings for each of the plurality of periods based on the productivity values.

7. The method of claim 1, wherein using the period-based groupings to generate the optimal deployment plan for deploying the one or more software updates to the respective end user device comprises:
   for each of the one or more software updates, defining an update window for installing the software update, the update window corresponding with a particular period of the plurality of periods.

8. The method of claim 7, wherein using the period-based groupings to generate the optimal deployment plan for deploying the one or more software updates to the respective end user device further comprises:
   employing state data to identify the particular period.

9. The method of claim 8, wherein the state data is obtained from installation of the one or more software updates on end user devices in a pilot group.

10. The method of claim 9, wherein the state data defines a number of applications that are closed during installation of the one or more software updates.

11. One or more computer storage media storing computer executable instructions which when executed implement a method for deploying software updates in coordination with end-user productivity, the method comprising:
    compiling, by one or more productivity agents executing on each of a plurality of end user devices, productivity impact data on a plurality of end user devices, the productivity impact data including productivity data for the respective end user device for each of a plurality of periods, the productivity data for the respective end user device comprising system load data for each of the plurality of periods, scheduling data for each of the plurality of periods, contextual data for each of the plurality of periods and use data for each of the plurality of periods, wherein the contextual data includes user proximity data and the use data includes a number of open applications or documents;
    creating, from the productivity impact data compiled for each of the plurality of end user devices, heat maps for the plurality of end user devices, each heat map defining, based on the productivity impact data for the respective end user device, whether the respective end user device was in use or the extent to which the respective end user device was in use during each of the plurality of periods;
    creating period-based groupings from the heat maps, wherein creating period-based groupings from the heat maps comprises, for each of a plurality of periods, dividing the plurality of end user devices into two or more groupings based on the heat maps;
    when one or more software updates are to be deployed to the end user devices, generating, for each of the end user devices, an optimal deployment plan from the period-based groupings;
    sending to each of the end user devices, the respective optimal deployment plan; and installing the one or more software updates on each end user device in accordance with the respective optimal deployment plan.

12. The computer storage media of claim 11, wherein creating the heat maps comprises associating a productivity value with each of the plurality of periods where the productivity value for a particular time period is selected based on the productivity impact data compiled during the particular time period.

13. The computer storage media of claim 11, wherein creating period-based groupings from the heat maps comprises, for each of the plurality of periods, dividing the plurality of end user devices into more than two groupings based on the heat maps.

14. The computer storage media of claim 11, wherein generating, for each of the end user devices, the optimal deployment plan from the period-based groupings comprises defining an update window for each of the one or more software updates.

15. The computer storage media of claim 14, wherein each update window corresponds with a particular period of the plurality of periods encompassed by the period-based groupings.

16. The computer storage media of claim 11, wherein each heat map is created either on the respective end user device or within a software update deployment solution.

17. A system for deploying software updates in coordination with end-user productivity, the system comprising:
  a plurality of end user devices, each of the plurality of end user devices including one or more hardware processors and memory;
  a set of one or more productivity agents on each of the plurality of end user devices, each set of one or more productivity agents being configured to compile productivity impact data for the respective end user device for a plurality of periods, the productivity data for the respective end user device comprising system load data for each of the plurality of periods, scheduling data for each of the plurality of periods, contextual data for each of the plurality of periods and use data for each of the plurality of periods, wherein the contextual data includes user proximity data and the use data includes a number of open applications or documents;
  a software update deployment solution; and
  an optimal deployment detection engine that is configured to:
    receive heat maps corresponding to the end user devices, each heat map being generated from the productivity impact data for the respective end user device;
    create period-based groupings from the heat maps, wherein the period-based groupings group the plurality of end user devices into groupings for each of a plurality of periods;
    when one or more software updates are to be deployed to the end user devices, generate for each of the end user devices, an optimal deployment plan from the period-based groupings; and
  send the optimal deployment plans to the respective end user devices to cause each end user device to install the one or more software updates in accordance with the respective optimal deployment plan.

\* \* \* \* \*